(12) United States Patent
Mori et al.

(10) Patent No.: US 9,145,028 B2
(45) Date of Patent: Sep. 29, 2015

(54) MOUNTING STRUCTURE OF WHEEL SPEED SENSOR RING

(71) Applicant: HONDA MOTOR CO., LTD., Minato-Ku, Tokyo (JP)

(72) Inventors: Yotaro Mori, Saitama (JP); Kineo Tomura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 14/098,617

(22) Filed: Dec. 6, 2013

(65) Prior Publication Data

US 2014/0175857 A1 Jun. 26, 2014

(30) Foreign Application Priority Data

Dec. 25, 2012 (JP) ................. 2012-281521

(51) Int. Cl.
| | |
|---|---|
| *F16D 65/12* | (2006.01) |
| *B60B 27/00* | (2006.01) |
| *B60T 8/17* | (2006.01) |
| *B60T 8/171* | (2006.01) |
| *B60T 8/32* | (2006.01) |
| *B62K 19/38* | (2006.01) |

(52) U.S. Cl.
CPC ......... *B60B 27/0068* (2013.01); *B60B 27/0052* (2013.01); *B60T 8/171* (2013.01); *B60T 8/1706* (2013.01); *B60T 8/3225* (2013.01); *B60T 8/329* (2013.01); *B62K 19/38* (2013.01)

(58) Field of Classification Search
CPC .... B60B 27/0068; B60T 8/329; B60T 8/1706
See application file for complete search history.

(56) References Cited

U.S. PATENT DOCUMENTS

| | | | |
|---|---|---|---|
| 7,322,437 B2 | 1/2008 | Toyoda | |
| 7,997,391 B2 * | 8/2011 | Burgoon et al. | 188/218 XL |
| 2006/0202553 A1 * | 9/2006 | Nimura et al. | 303/168 |
| 2006/0272906 A1 * | 12/2006 | Gonska | 188/218 XL |
| 2010/0078250 A1 * | 4/2010 | Nimura et al. | 180/226 |
| 2011/0241415 A1 * | 10/2011 | Mikura | 301/64.102 |
| 2013/0026731 A1 * | 1/2013 | Mikura et al. | 280/279 |

FOREIGN PATENT DOCUMENTS

| | | | |
|---|---|---|---|
| JP | 2005-271666 A | | 10/2005 |
| JP | 2010270888 A | * | 12/2010 |
| JP | 2012202869 A | * | 10/2012 |

* cited by examiner

*Primary Examiner* — Bradley King
(74) *Attorney, Agent, or Firm* — Carrier Blackman & Associates, P.C.; William D. Blackman; Joseph P. Carrier

(57) ABSTRACT

A mounting structure of a wheel speed sensor ring includes an intermediate ring made of aluminum which is fastened to a hub of a wheel body together with a brake disc in a state where the intermediate ring is brought into contact with the brake disc, and a pulser ring is supported on the intermediate ring in a floating state. A supported portion of the pulser ring is provided at a center position within the intermediate ring, and the intermediate ring includes a plurality of seat plate portions on an outer periphery thereof which are fastened between hub and the brake disc. The mounting structure has a compact size which permits various thermal effects caused by the generation of heat in a brake disc to be effectively suppressed.

14 Claims, 6 Drawing Sheets ring (74) includes a plurality of the fastening portions (84) which are arranged in spaced relation to each other in the circumferential direction of the intermediate ring (74) and which are fastened by being sandwiched between the fastening portion (51) of the wheel body (17a) and the fastening portion (79) of the brake disc (52), and a supported portion (77) of the pulser ring (75) is provided at a central position radially inward of the fastening portions (84).

According to a fifth aspect of the present invention, in addition to any of the first—fourth aspects, the intermediate ring (74) is formed using a material having higher thermal conductivity than the pulser ring (75).

Advantages of the Invention

With the first aspect of the present invention, the intermediate ring constitutes a heat sink for the brake disc, accelerating heat transfer from the brake disc and, at the same time, suppressing heat transfer to the pulser ring from the brake disc. Hence, it is possible to effectively suppress a thermal effect caused by heat generation in the disc brake on the pulser ring and the wheel body without any countermeasure that significantly increases the size of the pulser ring.

With the second aspect of the present invention, heat generated in the brake disc is transferred to the wheel body through the intermediate ring. Hence, direct heat transfer from the brake disc to the wheel body can be suppressed, whereby it is possible to favorably suppress an undesirable thermal effect caused by heat generation in the disc brake on the wheel body.

With the third aspect of the present invention, the pulser ring is supported in a floating state and hence, the heat transfer from the intermediate ring to the pulser ring can be favorably suppressed and, at the same time, the relative deformation of positioning between the intermediate ring and the pulser ring is allowable.

With the fourth aspect of the present invention, the fastening portion of the brake disc and the fastening portion of the pulser ring can be spaced apart from each other as much as possible and hence, the heat transfer from the brake disc to the pulser ring can be effectively suppressed.

With the fifth aspect of the present invention, the heat transfer from the brake disc through the intermediate ring, including heat radiation via the intermediate ring, can be favorably enhanced.

DETAILED DESCRIPTION OF EXEMPLARY MODE FOR CARRYING OUT THE INVENTION

Figure 1:
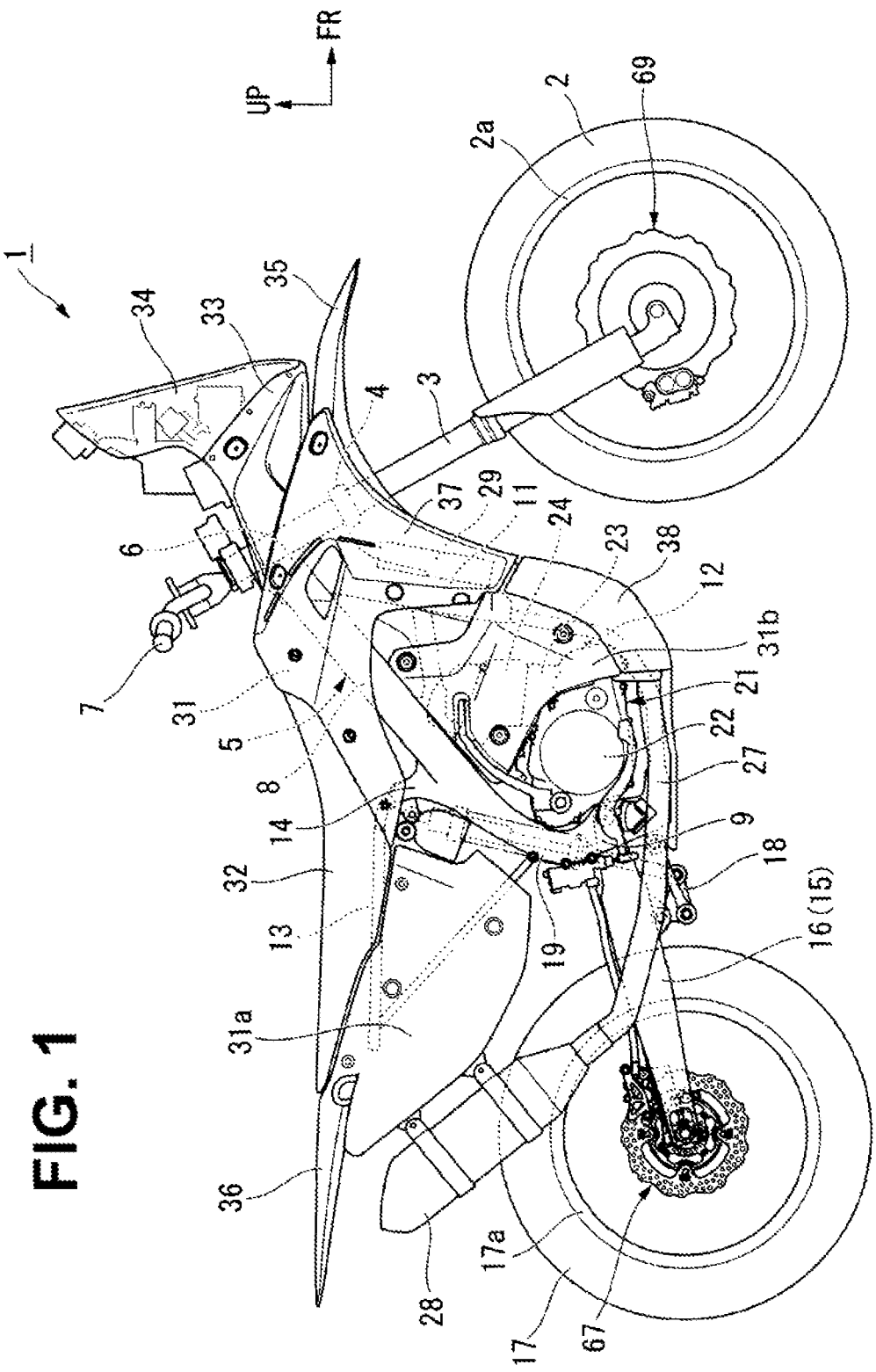
FIG. 1 is a right side view of a motorcycle including a mounting structure of a wheel speed sensor ring according to an exemplary embodiment of the invention.

Hereinafter, an exemplary embodiment of the invention is explained in conjunction with drawings. The directions such

MOUNTING STRUCTURE OF WHEEL SPEED SENSOR RING

TECHNICAL FIELD

The present invention relates to a mounting structure of a wheel speed sensor ring which is compact and permits accurate sensing.

BACKGROUND ART

Conventionally, in mounting a pulser ring (wheel speed sensor ring) used in an ABS (Antilock Brake System) or the like on a wheel body of a wheel, there has been known a structure wherein the pulser ring is fixed to the wheel body by fastening together with a brake disc (see JP-A-2005-271666, for example).

In the above-mentioned conventional structure, there may be a case where a brake disc expands due to its own heat generation when a brake is used at high frequency and hence, the pulser ring also expands along with the expansion of the brake disc to which it is fixed. In this case, it is necessary to take a countermeasure to assure sensor accuracy, such as the reinforcement of the pulser ring. Hence, there arises a drawback that the miniaturization of the structure is difficult to achieve.

SUMMARY OF THE INVENTION

Accordingly, it is an object of the invention to provide a mounting structure of a wheel speed sensor ring where various thermal effects caused by the generation of heat in a brake disc can be suppressed while maintaining a compact/miniature size of the wheel speed sensor arrangement.

The present provides a means for achieving such object, and for thereby overcoming the above-mentioned drawback of the conventional system. In this summary discussion of aspects of the invention reference numbers are provided which correlate to components of an exemplary embodiment of the invention presented herein for ease of understanding. However, it will be understood that the invention is not limited to the disclosed components of the exemplary embodiment.

According to a first aspect of the present invention there is provided a mounting structure of a wheel speed sensor ring which includes: a pulser ring (75) which is rotatable together with a wheel (17) and is configured to be detected while rotating; a sensor body (73) which detects rotation of the pulser ring (75); a brake disc (52) which is mounted on a wheel body (17a) of the wheel (17); and an intermediate ring (74) which is fastened to the wheel body (17a) together with the brake disc (52) in a state where the intermediate ring (74) is brought into contact with the brake disc (52), and the pulser ring (75) is supported on the intermediate ring (74).

According to a second aspect of the present invention, in addition to the first aspect, the intermediate ring (74) includes a fastening portion (84) which is fastened by being sandwiched between a fastening portion (51) of the wheel body (17a) and a fastening portion (79) of the brake disc (52).

According to a third aspect of the present invention, in addition to the first or second aspect, the mounting structure further includes a fastener interconnecting the pulser ring (75) and the intermediate ring (74) such that the pulser ring (75) is supported on the intermediate ring (74) in a floating state.

According to a fourth aspect of the present invention, in addition to any of the first—third aspects, the intermediate as "frontward", "rearward", "leftward" and "rightward" used in the explanation made hereinafter are equal to the corresponding directions of a vehicle to be explained hereinafter unless otherwise specified. Further, in proper places in the drawings used in the explanation made hereinafter, an arrow FR which indicates a front side of the vehicle, an arrow LH which indicates a left side of the vehicle, and an arrow UP which indicates an upper side of the vehicle are shown.

In an off-road-type motorcycle 1 shown in FIG. 1, a front wheel 2 is pivotally supported on lower end portions of left and right front forks 3. Upper portions of the left and right front forks 3 are pivotally supported on a head pipe 6 of a vehicle body frame 5 by way of a steering stem 4 in a steerable manner. A steering handle bar 7 is mounted on a top bridge of the steering stem 4.

The vehicle body frame 5 includes, as integral parts thereof: the head pipe 6; left and right main tubes 8 which extend rearward and downward from the head pipe 6; left and right pivot frames 9 to which rear end portions of the left and right main tubes 8 are connected; a single down frame 11 which extends rearward and downward from the head pipe 6 at a steeper angle than the left and right main tubes 8; and left and right lower frames 12 which are bifurcated in the lateral direction from a lower end portion of the down frame 11, extend rearward after being bent, and are connected to lower end portions of the left and right pivot frames 9. A seat frame 13 is connected to a rear upper side of the vehicle body frame 5. An engine (internal combustion engine) 21 which constitutes a prime mover of the motorcycle 1 is mounted in the inside of the vehicle body frame 5.

A front end portion of a bifurcated swing arm 15 is pivotally supported on the left and right pivot frames 9 in a vertically swingable manner. A rear wheel 17 of the motorcycle 1 is pivotally supported on rear end portions of left and right arms 16 of the bifurcated swing arm 15. A lower end portion of the rear cushion unit 19 is connected to a front lower side of the swing arm 15 by way of a link mechanism 18. An upper end portion of the rear cushion unit 19 is connected to a cross member 14 which extends between rear end portions of the left and right main tubes 8.

The engine 21 is a water-cooled single-cylinder engine having a crankshaft arranged parallel to the vehicle width direction (lateral direction), wherein a cylinder 23 is mounted on a front upper portion of a crankcase 22 which forms a lower portion of the engine 21 in an erected manner in the substantially vertical direction. A cylinder head 24 is fixedly mounted on the cylinder 23. A rear portion of the crankcase 22 also functions as a transmission case. An output shaft of a transmission projects from a left side of a rear portion of the crankcase 22. The output shaft and the rear wheel 17 are connected with each other in an interlocking manner by a chain-type power transmission mechanism.

An engine intake system is connected to a rear portion of the cylinder head 24, and an engine exhaust system is connected to a front portion of the cylinder head 24. In the drawing, symbol 27 indicates an exhaust pipe in an engine exhaust system where the exhaust pipe 27 passes through an area below the engine 21 and extends toward a right side of a rear portion of the vehicle body, and symbol 28 indicates a muffler which is arranged on a right side of the rear portion of the vehicle body and to which the exhaust pipe 27 is connected. A fuel tank 31 is arranged between left and right main tubes 8. A seat 32 which is supported on the seat frame 13 and on which an occupant sits is arranged behind the fuel tank 31.

A front cowling 33 which is supported on the vehicle body frame 5 and covers an area around the head pipe 6 from a front side is arranged on a front side of an upper portion of the vehicle body. A front wall portion of the front cowling 33 is formed of a transparent or semitransparent screen 34 which is arranged in an erected manner in front of a rider. Inside the screen 34, for example, a head lamp which illuminates a front side of the vehicle through the screen 34, various information display devices which display various kinds of information to a rider and the like are arranged.

In the drawing, symbol 35 indicates a front fender which is supported on a bottom bridge of the steering stem 4, symbol 36 indicates a rear fender which extends rearward from the seat 32, symbol 29 indicates left and right radiators which are arranged on both sides of the down frame 11, symbol 37 indicates left and right shrouds which cover an area ranging from side surfaces of the fuel tank 31 to a front side of side surfaces of the left and right radiators 29, symbol 31a indicates a second fuel tank which is arranged below a rear portion of the seat 32, symbol 31b indicates a third fuel tank which is arranged on a side of the engine 21, and symbol 38 indicates an undercover which covers an area ranging from a front side to a lower side of the engine 21.

The front wheel 2 and the rear wheel 17 respectively include a wire spoke wheel 2a, 17a where a hub and a rim are connected with each other by a plurality of wire spokes.

Figure 2:
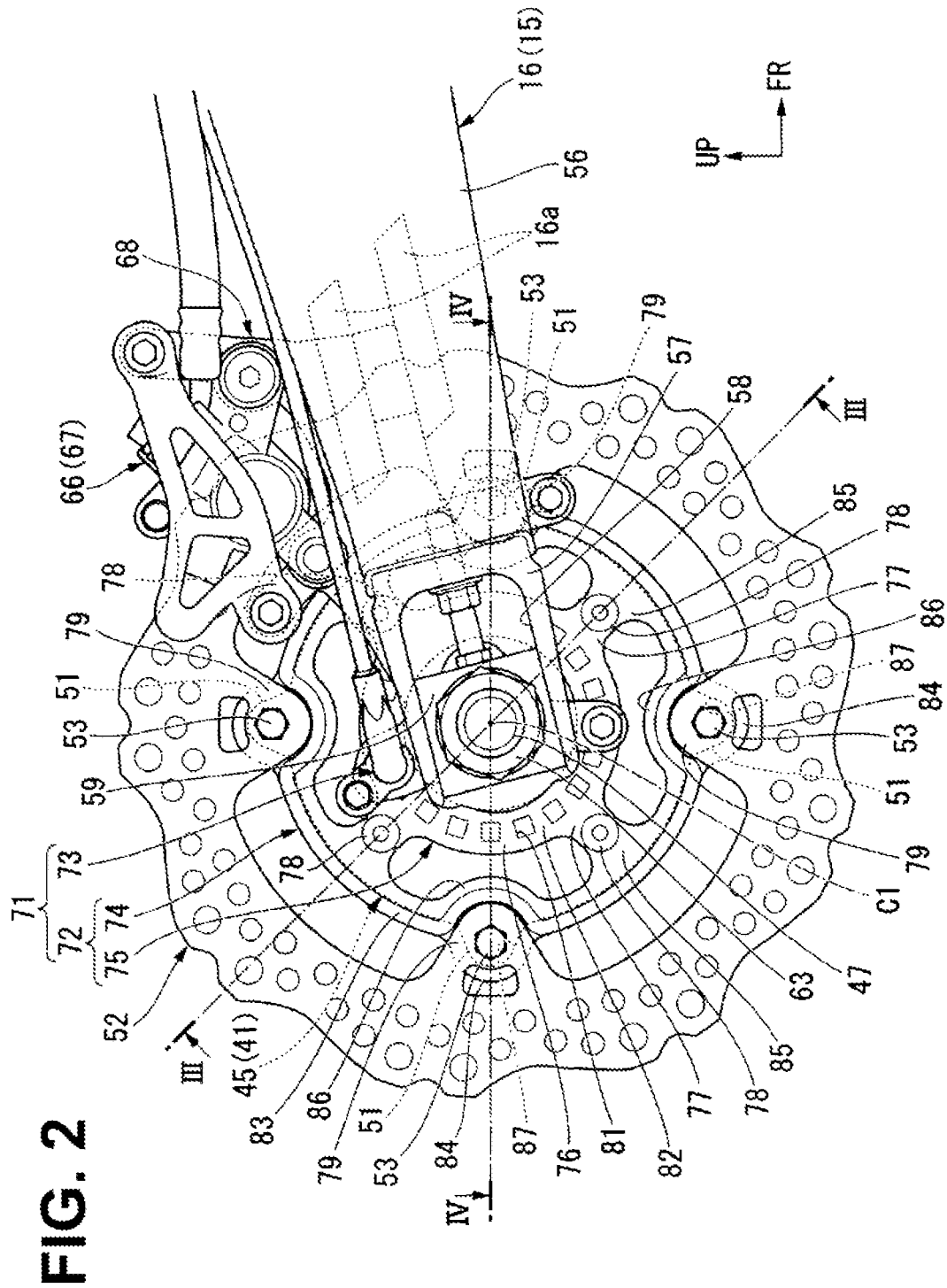
FIG. 2 is a right side view showing a rear wheel brake and an area around the rear wheel brake of the motorcycle in FIG. 1.
Figure 3:
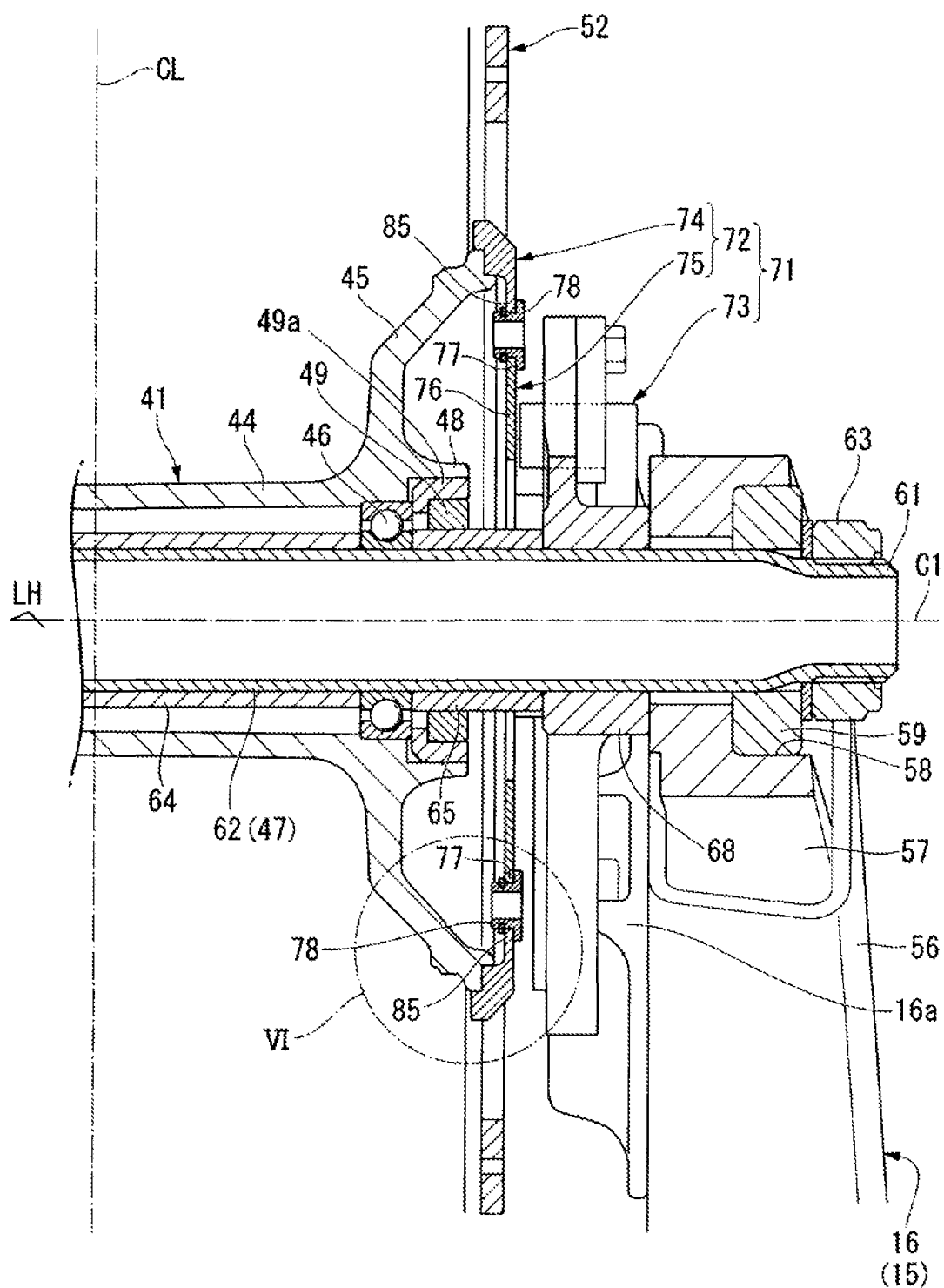
FIG. 3 is a cross-sectional view taken along a line III-III in FIG. 2.
Figure 4:
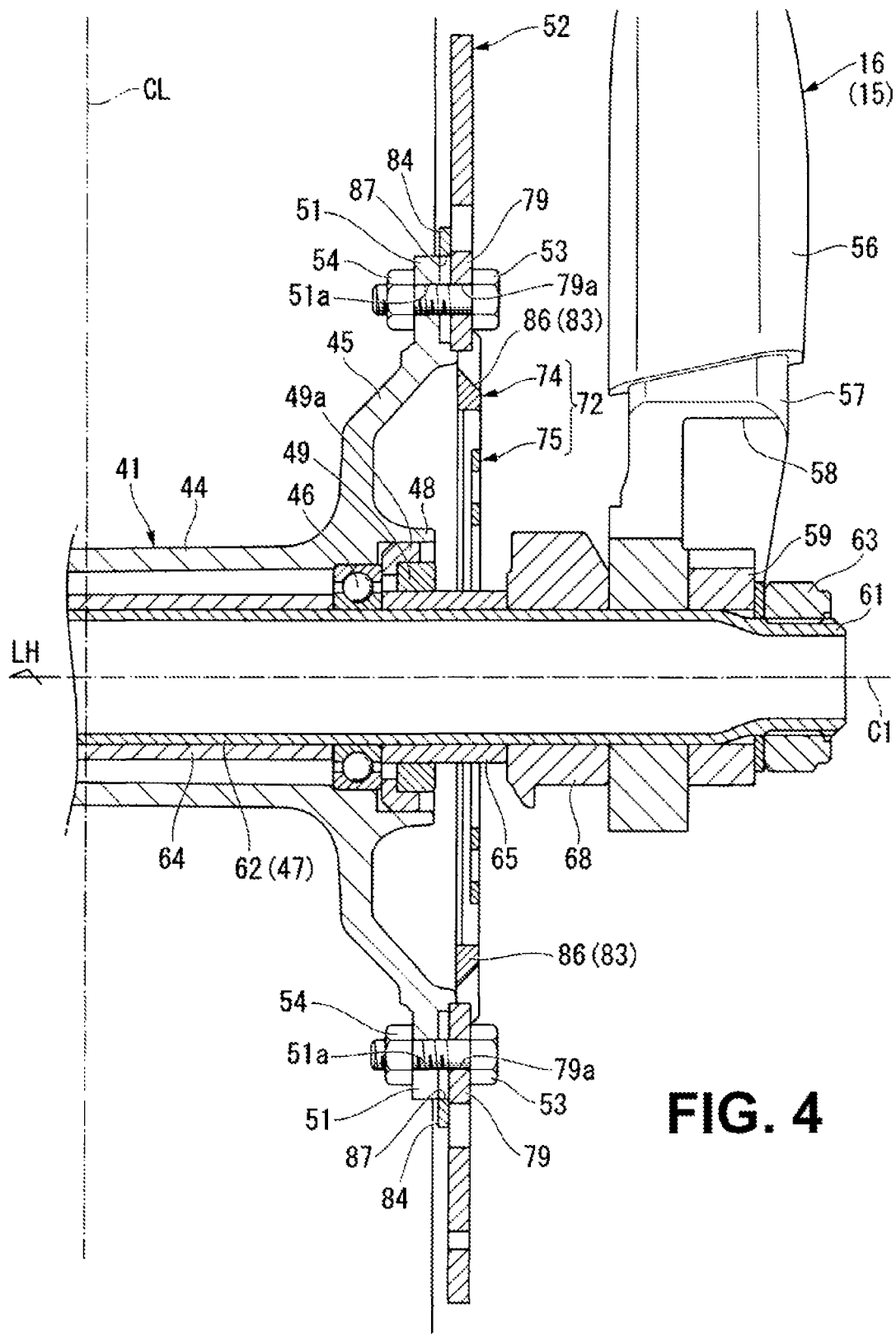
FIG. 4 is a cross-sectional view taken along a line IV-IV in FIG. 2.

As shown in FIG. 2 to FIG. 4, the hub 41 of the rear wheel 17 includes, as integral parts thereof: a circular cylindrical portion 44 which extends in the lateral direction while straddling a lateral center line CL of the vehicle body and the rear wheel 17; and a dish-shaped portion 45 which is formed on the outer periphery of a right end portion of the circular cylindrical portion 44 and has a circular shape as viewed in a side view with an enlarged diameter. The dish-shaped portion 45 is formed such that the dish-shaped portion 45 opens outwardly toward a rightward side of the motorcycle. Proximal end portions of the plurality of wire spokes are engaged with an outer peripheral wall of the dish-shaped portion 45. A right wheel bearing 46 is press-fitted into the center inner periphery of the dish-shaped portion 45. In cooperation with a left wheel bearing not shown in the drawing, the right wheel bearing 46 rotatably supports the hub 41 and, eventually, the rear wheel 17 on a rear axle 47. A cylindrical sealing wall 48 is formed on a right side of the center of the dish-shaped portion 45 in a raised manner. An annular bearing holder 49a is fitted into the inner periphery of the sealing wall 48. A sealing member 49 is fitted into a space defined between the inner periphery of the bearing holder 49a and the outer periphery of the rear axle 47. The hub 41 of the rear wheel 17 is made of an aluminum alloy.

With reference to FIG. 2 and FIG. 4, disc fastening portions 51 which project outward in the radial direction from the outer periphery of the dish-shaped portion 45 and have a semicircular shape as viewed in a side view are formed on the outer periphery of the dish-shaped portion 45. The plurality of (four in this embodiment) disc fastening portions 51 are arranged equidistantly in the circumferential direction of the dish-shaped portion 45. A bolt insertion hole 51a which allows an under-head of a fastening bolt 53 for fastening the brake disc 52 to pass therethrough is formed in each disc fastening portion 51. A nut 54 is threadedly engaged with the under-head of the fastening bolt 53 which projects leftward (toward the inside in the vehicle width direction) from the bolt insertion hole 51a on a left side of the disc fastening portion 51. The brake disc 52 is fixed to each of the disc fastening portions 51 by fastening the fastening bolt 53 and the nut 54 to each other. It may be configured such that the fastening bolt 53 is fastened to a nut hole formed in the disc fastening portion 51 without using the nut 54.

The swing arm 15 is formed as an integral body by joining a plurality of aluminum alloy parts by welding. The left and right arms 16 each include an arm body 56 having a square pipe shape, and a solid end piece 57 joined to a rear end of the arm body 56 respectively. A recessed portion 58 which extends in the longitudinal direction is formed on an outer side of the end piece 57, and a solid chain adjuster 59 made of an aluminum alloy is held in the recessed portion 58 in a longitudinally movable manner. An end portion of the rear axle 47 which passes through the hub 41 of the rear wheel 17 along the vehicle width direction is supported on the chain adjuster 59. In the drawing, symbol C1 indicates a center axis of the rear axle 47.

The rear axle 47 is formed of an elongated hollow stepped bolt. The rear axle 47 has a bolt head portion (not shown in the drawings) on a left end portion thereof and has a male threaded portion 61 on a right end portion thereof. The rear axle 47 has a columnar shaft portion 62 between the bolt head portion and the male threaded portion 61. The rear axle 47 passes through rear end portions of the left and right arms 16 and the hub 41 of the rear wheel 17 which is arranged between the left and right arms 16 in the direction from a left side to a right side, and an axle nut 63 is threadedly engaged with and fastened to the male threaded portion 61 which projects rightward from the chain adjuster 59 of the right arm 16. Due to such a constitution, the rear wheel 17 is pivotally supported relative to the motorcycle between the left and right arms 16. A center collar 64 is arranged between left and right wheel bearings through which the rear axle 47 passes. Left and right side collars (only the right side collar being indicated by symbol 65 in the drawing) are arranged on the outside of the left and right wheel bearings.

With reference to FIG. 1, between a rear portion of the right arm 16 of the swing arm 15 and the rear wheel 17, a rear disc brake 67 which includes the brake disc 52 fixed by fastening to a right side of the hub 41 of the rear wheel 17, and a caliper 66 which clamps the brake disc 52 is provided. Between a lower portion of the front fork 3 and the front wheel 2, a front disc brake 69 which is substantially the same as the rear disc brake 67 is provided.

With reference to FIG. 2 and FIG. 4, the brake disc 52 is formed into a disc shape and has an opening at the center thereof. A plurality of fastening portions 79 which correspond to the respective disc fastening portions 51 of the hub 41 are formed on the inner periphery of the brake disc 52 in a projecting manner. A bolt insertion hole 79a which allows the fastening bolt 53 to pass therethrough is formed in each fastening portion 79. The brake disc 52 is rigidly mounted on the hub 41 by fastening the fastening portions 79 to the disc fastening portions 51 of the hub 41. The brake disc 52 is made of a planar thick stainless steel plate, for example. The brake disc 52 is a so-called wave disc where the outer periphery of an annular portion clamped by the caliper 66 is formed into a wave shape as viewed in a side view. However, the brake disc 52 may be a conventional disc where the outer periphery of the annular portion is formed into a circular shape as viewed in a side view.

With reference to FIG. 2 and FIG. 3, the caliper 66 is supported on a right side of the rear axle 47 by way of a caliper bracket 68 which is arranged between the hub 41 and the right arm 16. The caliper bracket 68 is engaged with guide rails 16a fixedly mounted on an inner surface of the right arm 16 in a longitudinally movable manner, and is supported in a state where the caliper bracket 68 is not rotatable about the rear axle 47. The caliper bracket 68 is made of an aluminum alloy.

A wheel speed sensor 71 for an ABS (Antilock Brake system) or a traction control is provided on a right side of the rear wheel 17, for example. The wheel speed sensor 71 includes: a sensor ring assembly body 72 which is mounted on the dish-shaped portion 45 of the hub 41, and a sensor body 73 which is mounted on the caliper bracket 68 at a rear end portion of the right arm 16.

Figure 5:
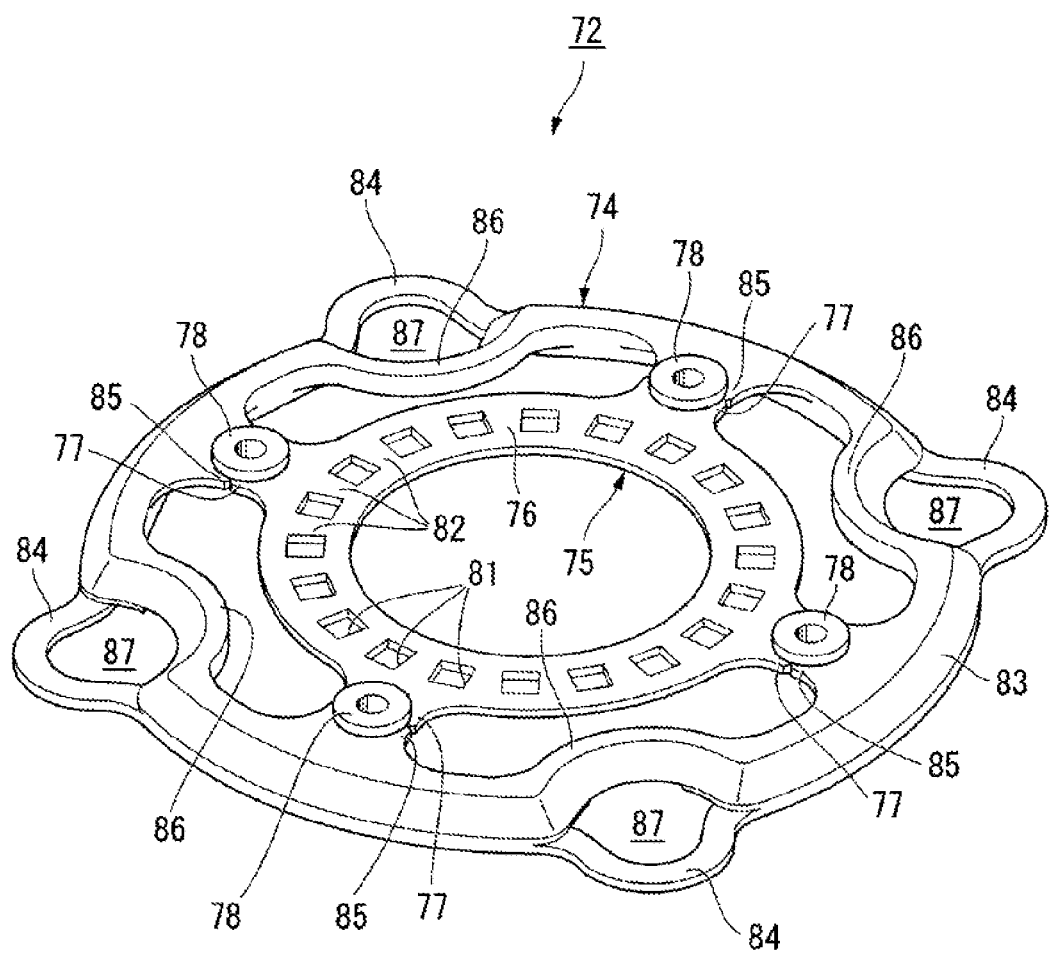
FIG. 5 is a perspective view of a sensor ring assembled body mounted on the rear wheel of the motorcycle in FIG. 1.

With reference to FIG. 5, the sensor ring assembly body 72 includes, as integral parts thereof: an intermediate ring 74 which is formed annularly, is disposed along the outer periphery of the dish-shaped portion 45 of the hub 41, and is fixed by being fastened to the respective disc fastening portions 51 as well as to the brake disc 52 using the bolts 53 and nuts 54; and an annular pulser ring 75 which is mounted on an inner peripheral side of the intermediate ring 74 in a floating state. In other words, the pulser ring 75 is indirectly mounted on the dish-shaped portion 45 of the hub 41 by way of the intermediate ring 74.

The pulser ring 75 includes, as integral parts thereof: an annular planar portion 76 which is to be detected and is arranged in the vicinity of a left side (inside in the vehicle width direction) of the sensor body 73 and is rotatable together with the rear wheel 17; and a plurality of supported plate portions 77 which are formed in a projecting manner on the outer periphery of the planar portion 76 corresponding to a plurality of support plate portions 85 formed on the inner periphery of the intermediate ring 74. A plurality of rectangular detection holes 81 are formed in the planar portion 76 for being detected such that the rectangular detection holes 81 are arranged in a spaced-apart manner in the circumferential direction of the planar portion 76. The respective supported plate portions 77 face respective ones of the support plate portions 85 of the intermediate ring 74 in the radial direction of the pulser ring. The support plate portions 85 and the supported plate portions 77 which face each other in an opposed manner in the radial direction are connected to each other by means of floating pins 78 respectively. A circlip 78a is mounted on the outer periphery of a distal end portion of each floating pin 78 thus preventing unintended removal of the floating pin 78 (see FIG. 6).

The pulser ring 75 is formed by applying plating to a planar steel sheet, for example. When the pulser ring 75 is rotated together with the rear wheel 17, the plurality of detection holes 81 formed in the planar portion 76 and partition portions 82 each of which is arranged between adjacent ones of the detection holes 81 are made to pass very close to an inner end (detection portion) of the sensor body 73. The sensor body 73 outputs a change in magnetic flux generated when the detection hole 81 and the partition portion 82 pass very close to the detection portion due to the rotation of the rear wheel 17 as a pulse signal corresponding to a rotational speed of the rear wheel 17. The pulse signal is transmitted to a controller (not shown in the drawings) and is used as wheel speed data in a control of an ABS, a traction control system, and the like.

The intermediate ring 74 includes, as integral parts thereof: an annular ring body 83 which is arranged along the outer periphery of the dish-shaped portion 45 of the hub 41; a plurality of seat plate portions 84 which are formed in a projecting manner on the outer periphery of the ring body 83 at positions facing the respective disc fastening portions 51 of the dish-shaped portion 45; and a plurality of support plate portions 85 which are formed in a projecting manner on the inner periphery of the ring body 83 at center positions each of which is arranged between the seat plate portions 84 arranged adjacent to each other in the circumferential direction of the ring body 83.

Figure 6:
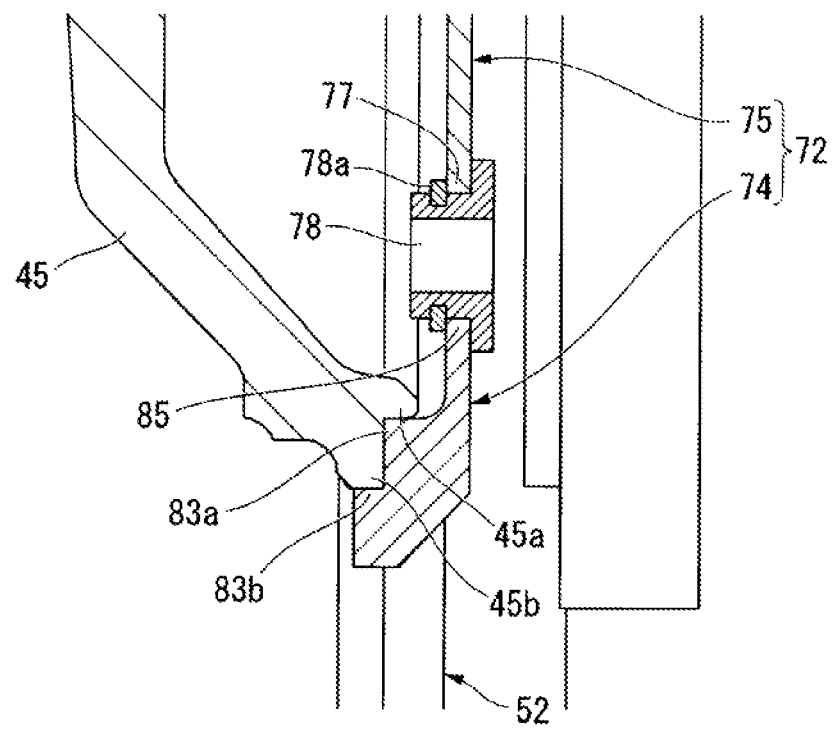
FIG. 6 is an enlarged view of a portion indicated by symbol VI in FIG. 3.

With reference to FIGS. 3 and 6, a first ring receiving portion 45a is formed in a projecting manner on an annular right end surface of the dish-shaped portion 45 such that the first ring receiving portion 45*a* is arranged along the inner periphery of the annular right end surface. The first ring receiving portion 45*a* projects rightward (intermediate ring 74 side), and is engaged with an inner peripheral stepped portion 83*a* formed on a back surface side (left side) of the ring body 83. Due to such a constitution, the intermediate ring 74 is positioned in the radial direction with respect to the dish-shaped portion 45.

In this embodiment, a second ring receiving portion 45*b* is formed on an outer peripheral end of the dish-shaped portion 45, and the second ring receiving portion 45*b* is engaged with the inner periphery of an outer peripheral stepped portion 83*b* formed on the back surface side (left side) of the ring body 83.

With reference to FIGS. 3 to 5, the ring body 83 is formed with a larger wall thickness compared to the seat plate portions 84 and the support plate portions 85 such that the respective support plate portions 85 are offset toward the outside by a predetermined amount with respect to the respective seat plate portions 84 which are brought into contact with the respective disc fastening portions 51 from the outside. The pulser ring 75 is supported on the respective support plate portions 85 coplanar with the respective support plate portions 85. An outer peripheral side and an outer-side-surface side of the ring body 83 are chamfered. Curved portions 86 which are curved toward the inside in the radial direction forming a semicircular shape as viewed in a side view respectively are formed on the ring body 83 at positions corresponding to the respective seat plate portions 84.

With reference to FIGS. 2, 4, and 5, the seat plate portions 84 are formed in a projecting manner toward the outside in the radial direction in a substantially semicircular shape as viewed in a side view such that the shape of the seat plate portions 84 conforms to a profile of the disc fastening portion 51 as viewed in a side view. The seat plate portions 84 are sandwiched between the disc fastening portions 51 and the fastened portions 79 of the brake disc 52, and the seat plate portions 84 and the fastened portions 79 are fixed by fastening to the disc fastening portions 51 in such a state.

The intermediate ring 74 is made of a material such as an aluminum alloy, for example, which exhibits higher thermal conductivity and is more light-weight than iron. The intermediate ring 74 is formed by a manufacturing method by which a large wall thickness can be acquired easily such as casting or cutting. By bringing the intermediate ring 74 into face contact with the brake disc 52 by way of the seat plate portions 84, heat generated in the brake disc 52 is transferred to the intermediate ring 74 before being transferred to the hub 41 and the pulser ring 75. The intermediate ring 74 has a large wall thickness so that heat capacity is large and thermal conductivity is high whereby heat generated in the brake disc 52 can be easily radiated via the intermediate ring 74. The heat radiation area of the intermediate ring 74 may be increased by forming an outer surface of the intermediate ring 74 in an uneven shape instead of a flattened shape.

A bolt insertion opening 87 formed in the seat plate portion 84 is sufficiently large compared to the respective bolt insertion holes 51*a*, 79*a* formed in the disc fastening portion 51 of the dish-shaped portion 45 and the fastening portions 79 of the brake disc 52. Accordingly, the intermediate ring 74 is relatively displaceable with respect to the dish-shaped portion 45 and the brake disc 52 due to the displacement of the seat plate portion 84 in face contact. Hence, strain generated in the pulser ring 75 due to the thermal deformation of these parts can be suppressed thus stably maintaining the relative positional relationship between the sensor body 73 and the pulser ring 75.

As has been explained heretofore, the mounting structure of the wheel speed sensor ring according to the above-mentioned exemplary embodiment includes the intermediate ring 74 made of aluminum which is fastened to the hub 41 of the wheel body 17*a* together with the brake disc 52 in a state where the intermediate ring 74 is brought into contact with the brake disc 52, and the pulser ring 75 is supported on the intermediate ring 74 in a floating state. Hence, the intermediate ring 74 constitutes a heat sink for the brake disc 52 and accelerates the heat transfer from the brake disc 52 and, at the same time, the heat transfer to the pulser ring 75 from the brake disc 52 is suppressed whereby it is possible to suppress a thermal effect caused by heat generation in the rear disc brake 67 on the pulser ring 75 and the hub 41 of the wheel body 17*a* (right wheel bearing 46).

The invention is not limited to the above-mentioned embodiment and, for example, the vehicle speed sensor 71 may be used in assisting an operation of a car navigation system and the like besides an ABS and a traction control system.

The intermediate ring 74 may preferably be made of aluminum which exhibits high thermal conductivity, is light-weight and can be manufactured at a low cost. However, the material of the intermediate ring 74 is not limited to aluminum, and the intermediate ring 74 may be manufactured using a material which exhibits higher thermal conductivity (eventually higher heat radiation property) than the pulser ring 75 made of iron.

As an alternative arrangement, it is possible to externally mount the intermediate ring 74 on an outer surface of the brake disc 52 without sandwiching the intermediate ring 74 between the hub 41 and the brake disc 52. However, by sandwiching the intermediate ring 74 between the hub 41 and the brake disc 52, an effect of suppressing the transfer of heat from the brake disc 52 to the hub 41 can be enhanced. Further, the intermediate ring 74 may be mounted on the brake disc 52.

The support plate portions 85 of the intermediate ring 74 may be provided at positions close to the fastened portions 79 in the circumferential direction of the brake disc 52, for example. However, by providing the support plate portion 85 at a center position between the fastened portions 79, the support plate portion 85 can be arranged in a spaced-apart manner from the fastened portions 79 as much as possible. Hence, an effect of suppressing the transfer of heat from the brake disc 52 to the pulser ring 75 can be enhanced.

The pulser ring 75 may be rigidly mounted on the intermediate ring 74. However, by mounting the pulser ring 75 on the intermediate ring 74 in a floating state as in the exemplary example, the transfer of heat from the intermediate ring 74 to the pulser ring 75 can be better suppressed and the relative deformation of the intermediate ring 74 and the pulser ring 75 is also allowable.

The invention may also be applied to a front wheel 2 side. That is, a pulser ring may be supported such that an intermediate ring is sandwiched between a wheel body 2*a* of the front wheel 2 and a brake disc and the pulser ring is supported on the intermediate ring.

The invention is not limited to a wheel having a wire spoke wheel body, e.g., it may also be applied to a wheel having a cast wheel body.

The invention is not limited to a motorcycle (including a bicycle with a prime mover and a scooter-type vehicle), and may similarly be applied to three-wheeled vehicle (including a vehicle having two front wheels and one rear wheel besides a vehicle having one front wheel and two rear wheels) or a four-wheeled vehicle.

The constitution in the above-mentioned exemplary embodiment exhibits just one example of the invention, and various modifications are conceivable without departing from the gist of the invention which is reflected in the claims appended hereto.

DESCRIPTION OF REFERENCE NUMERALS AND SIGNS

17: rear wheel (wheel)
17a: wire spoke wheel body (wheel body)
51: disc fastening portion (fastening portion)
52: brake disc
73: sensor body
74: intermediate ring
75: pulser ring
77: plate portions to be supported (portion to be supported)
79: portion to be fastened
84: seat plate portion (fastening portion)

We claim:

1. A mounting structure of a wheel speed sensor ring comprising:
   a pulser ring which is rotatable together with a wheel and is configured to be detected while rotating;
   a sensor body which detects rotation of the pulser ring;
   a brake disc which is mounted on a wheel body of the wheel;
   an intermediate ring disposed between the pulser ring and the brake disc, wherein the intermediate ring is fastened to the wheel body together with the brake disc in a state where the intermediate ring contacts the brake disc, and the pulser ring is supported on the intermediate ring, and
   a fastener which supports the pulser ring on the intermediate ring in a floating state.

2. The mounting structure of a wheel speed sensor ring according to claim 1, wherein the intermediate ring includes a fastening portion which is fastened such that it is sandwiched between a fastening portion of the wheel body and a fastening portion of the brake disc.

3. The mounting structure of a wheel speed sensor ring according to claim 2, wherein the fastening portion of the intermediate ring is disposed at an outer periphery of the intermediate ring.

4. The mounting structure of a wheel speed sensor ring according to claim 1, wherein the fastener is a floating pin which permits relative movement between the intermediate ring and the pulser ring.

5. The mounting structure of a wheel speed sensor ring according to claim 1, wherein the intermediate ring includes a plurality of fastening portions which are fastened so that they are sandwiched between the fastening portion of the wheel body and the fastening portion of the brake disc and are arranged equidistantly in the circumferential direction of the intermediate ring, and
   a supported portion of the pulser ring is provided at a central position radially inward of the fastening portions of the intermediate ring which are arranged in spaced relation to each other in the circumferential direction of the intermediate ring.

6. The mounting structure of a wheel speed sensor ring according to claim 5, wherein the fastening portions of the intermediate ring are disposed on an outer periphery of the intermediate ring, and the supported portion of the pulser ring is disposed radially inwardly of an inner periphery of the intermediate ring.

7. The mounting structure of a wheel speed sensor ring according to claim 3, wherein the intermediate ring includes a plurality of fastening portions which are fastened so that they are sandwiched between the fastening portion of the wheel body and the fastening portion of the brake disc and are arranged equidistantly in the circumferential direction of the intermediate ring, and
   a supported portion of the pulser ring is provided at a central position radially inward of the fastening portions of the intermediate ring which are arranged in spaced relation to each other in the circumferential direction of the intermediate ring.

8. The mounting structure of a wheel speed sensor ring according to claim 1, wherein the intermediate ring is formed using a material having higher thermal conductivity than the pulser ring.

9. The mounting structure of a wheel speed sensor ring according to claim 8, wherein the intermediate ring has a larger heat radiation capacity than that of the pulser ring.

10. The mounting structure of a wheel speed sensor ring according to claim 8, wherein the intermediate ring supports the pulser ring in spaced relation to the brake disc.

11. The mounting structure of a wheel speed sensor ring according to claim 2, wherein the intermediate ring is formed using a material having higher thermal conductivity than the pulser ring.

12. The mounting structure of a wheel speed sensor ring according to claim 1, wherein the intermediate ring is formed using a material having higher thermal conductivity than the pulser ring.

13. The mounting structure of a wheel speed sensor ring according to claim 5, wherein the intermediate ring is formed using a material having higher thermal conductivity than the pulser ring.

14. The mounting structure of a wheel speed sensor ring according to claim 1, wherein an outer peripheral portion of the intermediate ring is fastened to the wheel body and the brake disc, and the pulser ring is supported on an inner peripheral portion of the intermediate ring.

* * * * *